United States Patent
Shimizu (10) Patent No.: US 9,729,798 B2
(45) Date of Patent: Aug. 8, 2017

(54) IMAGE-CAPTURING APPARATUS WHICH CONTROLS IMAGE-CAPTURING DIRECTION

(71) Applicant: CASIO COMPUTER CO., LTD., Shibuya-ku, Tokyo (JP)

(72) Inventor: Hiroshi Shimizu, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 35 days.

(21) Appl. No.: 14/923,220

(22) Filed: Oct. 26, 2015

(65) Prior Publication Data

US 2016/0173765 A1 Jun. 16, 2016

(30) Foreign Application Priority Data

Dec. 12, 2014 (JP) ................................. 2014-251436

(51) Int. Cl.
*H04N 5/235* (2006.01)
*H04N 5/232* (2006.01)

(52) U.S. Cl.
CPC ........... *H04N 5/2353* (2013.01); *H04N 5/232* (2013.01); *H04N 5/23219* (2013.01); *H04N 5/23264* (2013.01)

(58) Field of Classification Search
None
See application file for complete search history.

(56) References Cited

U.S. PATENT DOCUMENTS

| 2003/0174902 A1* | 9/2003 | Barkan | H04N 5/367 382/274 |
| 2006/0001061 A1* | 1/2006 | Miyatake | H04N 5/35518 257/292 |
| 2008/0068474 A1* | 3/2008 | Sakamoto | H04N 5/2178 348/247 |
| 2012/0033954 A1* | 2/2012 | Wakamatsu | G02B 27/646 396/55 |
| 2014/0198184 A1* | 7/2014 | Stein | G06K 9/00791 348/47 |

FOREIGN PATENT DOCUMENTS

| JP | 2008124763 A | 5/2008 |
| JP | 2010081041 A | 4/2010 |
| JP | 2011244385 A | 12/2011 |

OTHER PUBLICATIONS

Japanese Office Action (and English translation thereof) dated Jan. 24, 2017 issued in Japanese counterpart Application No. 2014-251436.

* cited by examiner

Primary Examiner — Mark T Monk
(74) Attorney, Agent, or Firm — Holtz, Holtz & Volek PC

(57) ABSTRACT

An image-capturing apparatus includes the following. An image-capturing unit performs exposure of each frame to generate a captured image of a subject. A changing unit changes an image-capturing direction of the image-capturing unit. A control unit controls the changing unit to change the image-capturing direction of the image-capturing unit. The control unit determines a valid term in which the image-capturing direction is changed according to an exposure term of the image-capturing unit. The control unit controls the changing unit to change the image-capturing direction during the determined valid term.

8 Claims, 8 Drawing Sheets

IMAGE-CAPTURING APPARATUS WHICH CONTROLS IMAGE-CAPTURING DIRECTION

CROSS-REFERENCE TO RELATED APPLICATIONS

The present U.S. patent application claims priority under the Paris Convention of Japanese Patent Application No. 2014-251436 filed on Dec. 12, 2014 the entirety of which is incorporated herein by reference.

FIELD OF THE INVENTION

The present invention relates to an image-capturing apparatus which controls an image-capturing direction.

BACKGROUND OF THE INVENTION

Conventionally, there is a well-known image-capturing apparatus which is able to analyze a captured image, detect a subject and change an image-capturing direction according to a position of the detected subject (for example, Japanese Patent Application Laid-Open Publication No. 2010-81041). Such control of image-capturing direction is done in chasing a subject, correcting shaking and panoramic image-capturing.

SUMMARY OF THE INVENTION

According to an aspect of the present invention, there is provided an image-capturing apparatus including:

an image-capturing unit which performs exposure of each frame to generate a captured image of a subject;

a changing unit which changes an image-capturing direction of the image-capturing unit; and a control unit which controls the changing unit to change the image-capturing direction of the image-capturing unit, wherein, the control unit determines a valid term in which the image-capturing direction is changed according to an exposure term of the image-capturing unit, and the control unit controls the changing unit to change the image-capturing direction during the determined valid term.

BRIEF DESCRIPTION OF THE DRAWINGS

The present invention and the above-described objects, features and advantages thereof will become more fully understood from the following detailed description with the accompanying drawings and wherein.

DETAILED DESCRIPTION OF THE PREFERRED EMBODIMENTS

An embodiment of the present invention is described with reference to the drawings.

Figure 1:
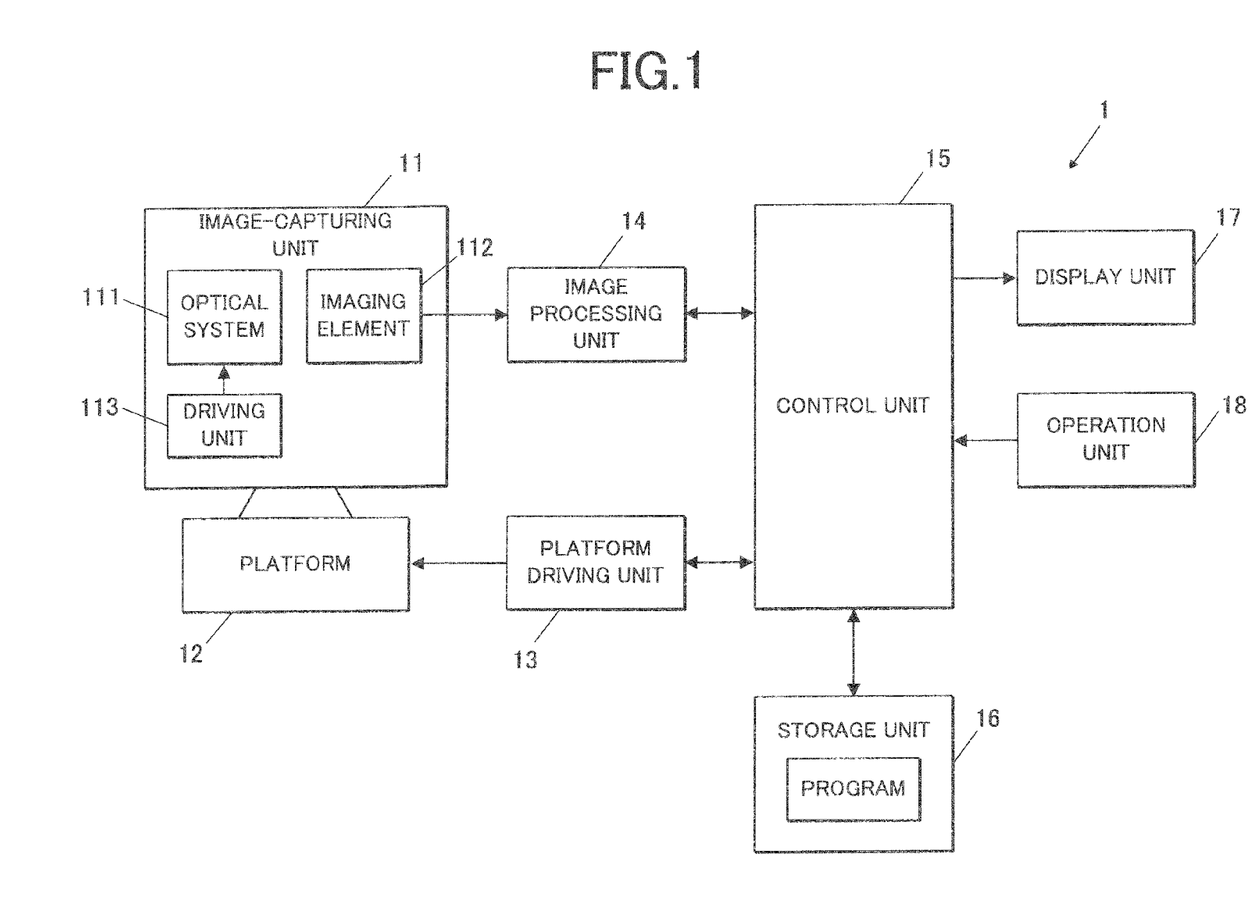
FIG. 1 is a block diagram showing a configuration of the image-capturing apparatus of the present embodiment according to function.

FIG. 1 is a block diagram showing the main configuration of the image-capturing apparatus 1 of the present embodiment according to function.

As shown in FIG. 1, the image-capturing apparatus 1 includes an image-capturing unit 11, a platform 12, a platform driving unit 13, an image processing unit 14, control unit 15, a storage unit 16, a display unit 17, and an operation unit 18.

An image-capturing unit 11 exposes each frame and generates a captured image of the subject.

As shown in FIG. 1, the image-capturing unit 11 includes an optical system 111 which images light entering into the image-capturing unit 11, an imaging element 112 which performs photoelectric conversion on the inserted light imaged by the optical system 111 and generates the captured image; and a driving unit 113 of the optical system 111.

The optical system 111 may include for example, a mirror, and a lens group which images the entering light guided by the mirror on the imaging surface of the imaging element 112.

A CMOS (Complementary Metal Oxide Semiconductor) or CCD (Charge Coupled Device), can be used as the imaging element 112.

A driving unit 113 can drive the optical system 111 to change the position or the posture of the optical system 111 for the purpose of focusing.

The platform 12 rotatably supports the image-capturing unit 11.

The platform driving unit 13 (changing unit) rotates the platform 12 to change the posture of the image-capturing unit 11 according to instruction information of the image-capturing direction from the control unit 15, and with this, the platform driving unit 13 is able to change the image-capturing direction of the image-capturing unit 11. Instead of rotating, the position of the image-capturing unit 11 can be moved by tilting and panning to change the image-capturing direction of the image-capturing unit 11.

The image processing unit 14 performs various image processing such as A/D conversion, shading correction, color correction, etc. on the captured image generated by the image-capturing unit 11.

The control unit 15 controls the operation of each unit of the image-capturing apparatus 1. The control unit 15 can include a CPU (Central Processing Unit), a RAM (Random Access Memory) and the like.

For example, the control unit 15 starts exposure of each frame at a predetermined frame rate in the image-capturing unit 11 to generate a captured image. The control unit 15 stores the generated captured image in the storage unit 16, and displays a preview screen of the generated captured image on the display unit 17.

The control unit 15 is able to change the image-capturing direction of the image-capturing unit 11 with the platform driving unit 13 in chasing a subject, correcting shaking and panoramic image-capturing. Specifically, the control unit 15 (detecting unit) detects the subject in the captured image of the frame generated by the image-capturing unit 11. The control unit 15 determines the image-capturing direction of the next frame according to the position of the detected subject, outputs the instruction information of the determined image-capturing direction to the platform driving unit 13, and changes the image-capturing direction of the image-capturing unit 11 to the determined image-capturing direction.

In order to prevent blur of the subject due to change of the image-capturing direction, the control unit 15 determines the valid term of the change of the image-capturing direction depending on the exposure term of the image-capturing unit 11, and the platform driving unit 13 changes the image-capturing direction within the determined valid term.

When the valid term is determined, the control unit 15 (calculating unit) is able to calculate movement speed and movement direction of the subject from the change of position of the subject detected in each frame. The control unit 15 (predicting unit) is able to predict a range of the line where the subject is positioned in the next frame based on at least one of the calculated movement speed or movement direction of the subject.

The storage unit 16 stores a program performed by the control unit 15, a file necessary to perform the program and the like.

The storage unit 16 also stores the captured image of each frame generated by the image-capturing unit 11.

A non-volatile memory such as a flash memory can be used as the storage unit 16.

The display unit 17 displays an operation screen, a preview screen of the captured image, etc. on a display such as a LCD (Liquid Crystal Display) according to an instruction from the control unit 15.

The operation unit 18 generates an operation signal and outputs the signal to the control unit 15 according to operation of buttons provided on the image-capturing apparatus 1 such as an image-capturing execute button, menu button, etc., and or a touch panel composed as one with the display unit 17.

The image-capturing apparatus 1 is able to change the image-capturing direction according to the position of the subject and capture the subject.

Figure 2:
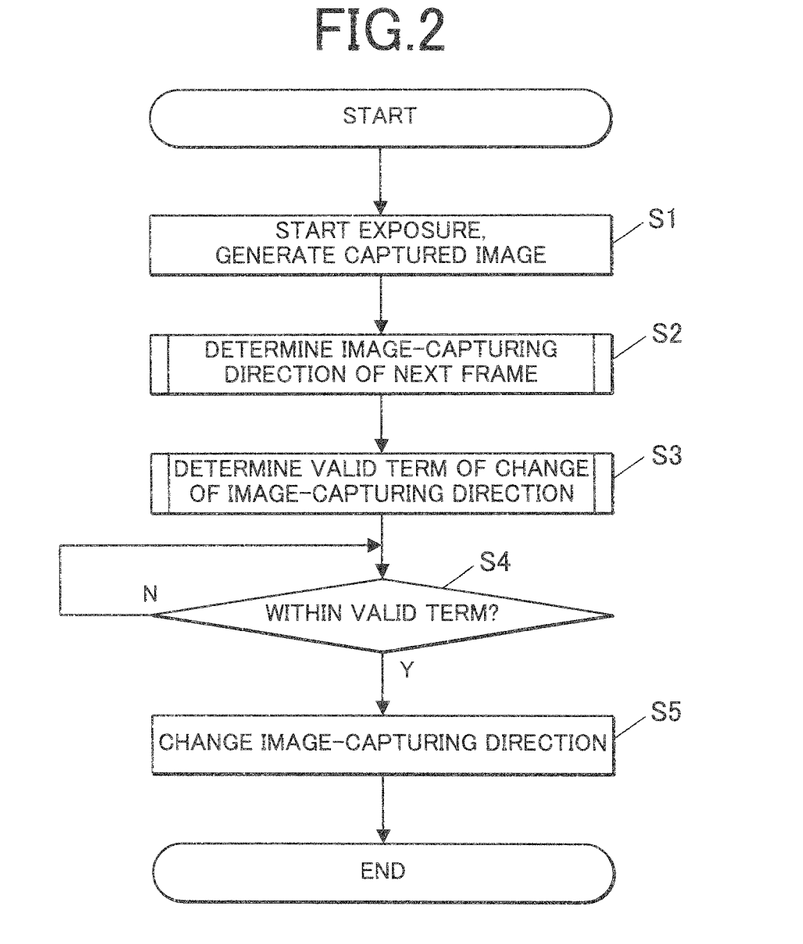
FIG. 2 is a flowchart showing a process in the image-capturing apparatus from when exposure of one frame starts to when exposure of the next frame starts.

FIG. 2 shows a process from the start of exposure of the n-th frame to the start of the exposure of the next frame, n+1-th frame in the image-capturing apparatus 1 which changes the image-capturing direction and performs image-capturing.

As shown in FIG. 2, in the image-capturing apparatus 1, the image-capturing unit 11 starts exposure and generates the n-th frame of the captured image (step S1).

After the image processing unit 14 performs various image processing on the generated captured image, the control unit 15 stores the processed captured image in the storage unit 16. The control unit 15 determines the image-capturing direction of the next n+1-th frame (step S2).

Figure 3:
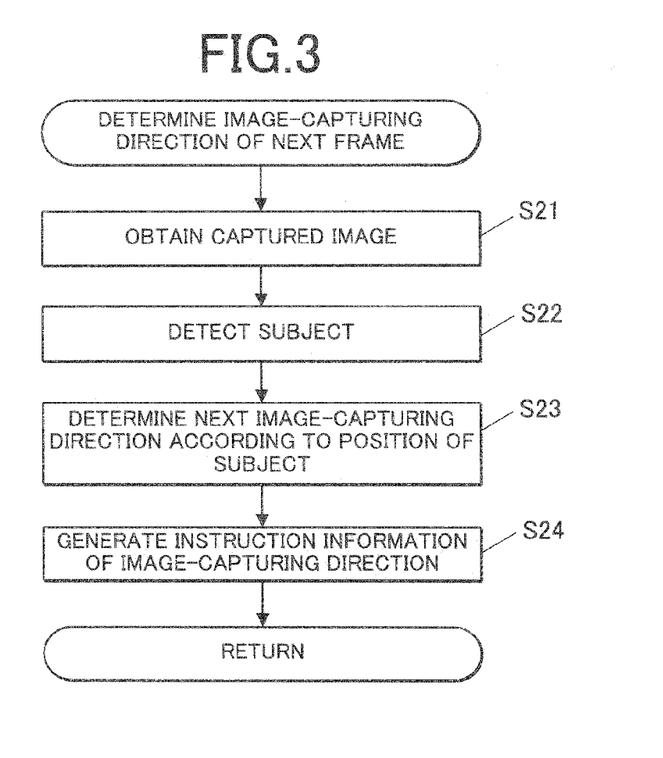
FIG. 3 is a flowchart showing a process when an image-capturing direction of the next frame is determined.

FIG. 3 shows a process to determine the image-capturing direction of the next frame.

As shown in FIG. 3, the control unit 15 reads and obtains the captured image of the n-th frame from the storage unit 16 (step S21), and detects the subject in the captured image (step S22).

The control unit 15 is able to detect the subject specified by the user with pattern matching, and is able to detect the face, moving body, etc. as the subject by face recognition, moving body recognition, etc.

The control unit 15 determines the image-capturing direction of the next n+1-th frame according to the position of the detected subject (step S23).

Figure 4:
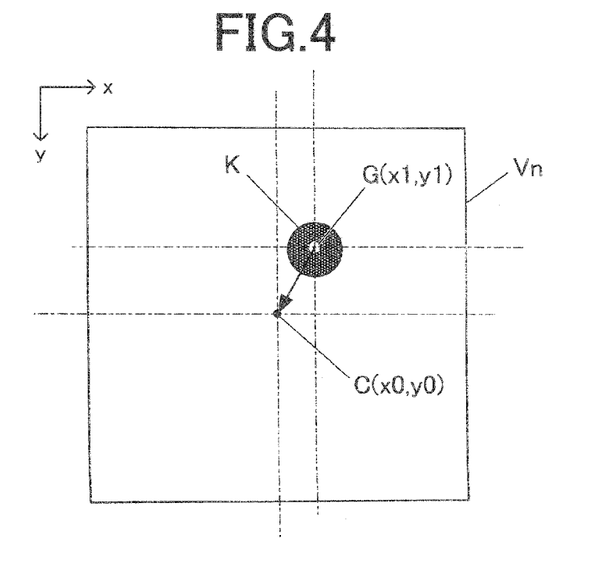
FIG. 4 is a diagram showing an example of a captured image in which a subject is detected.

For example, in the captured image Vn in which the subject K is detected as shown in FIG. 4, the control unit 15 calculates the position coordinates (x1, y1) of a center of gravity G of a subject K in xy coordinates in which center C of the captured image Vn is to be an origin (x0, y0). The xy coordinates is a coordinate system which represents the position of each pixel in the captured image Vn in the x direction and the y direction. If the control unit 15 positions a target position, for example, the center of gravity G of the subject K in the position of the center C of the captured image Vn in the next frame, the vector direction shown with an arrow from the center of gravity G of the subject K to the center C of the captured image is determined to be the image-capturing direction of the next frame.

The control unit 15 generates the instruction information to change the image-capturing direction of the image-capturing unit 11 to the determined image-capturing direction (step S24).

Figure 5:
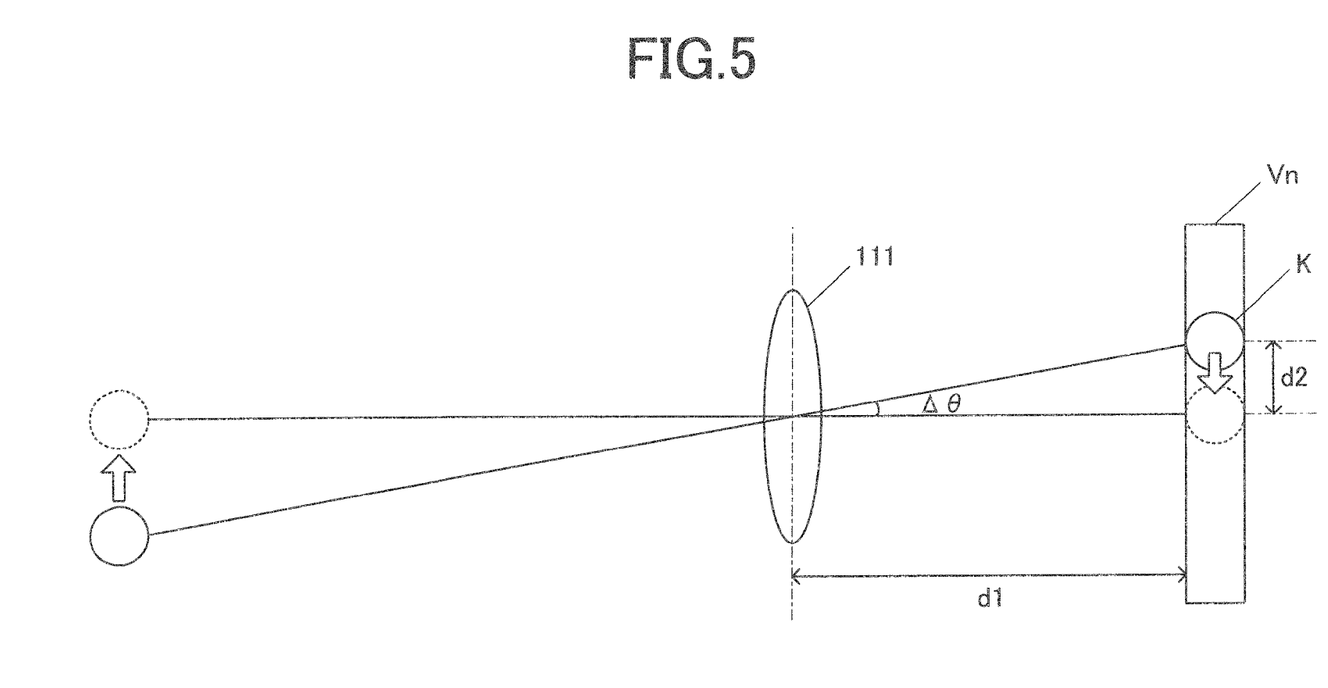
FIG. 5 is a diagram showing an angle formed by the image-capturing direction before change and the image-capturing direction after change.

In the captured image Vn shown in FIG. 4, the control unit 15 calculates an angle AO which is formed by the determined image-capturing direction and the present image-capturing direction. As shown in FIG. 5, the angle AO can be calculated by obtaining arctan of focal distance d1 from the optical system 111 to the imaging element 113 and distance d2 that the detected subject K is moved in the captured image Vn due to the change in the image-capturing direction. The control unit 15 obtains an angle θobs of the platform 12 from the platform driving unit 13 when the n-th frame is exposed and AO is added to this angle θobs to calculate angle θnext. The control unit 15 generates instruction information to rotate the platform 12 from the present angle θobs to the calculated angle θnext.

When the image-capturing direction is determined as described above, as shown in FIG. 2, the control unit 15 determines the valid term of the change of the image-capturing direction according to the exposure term of the image-capturing unit 11 (step S3).

Figure 6:
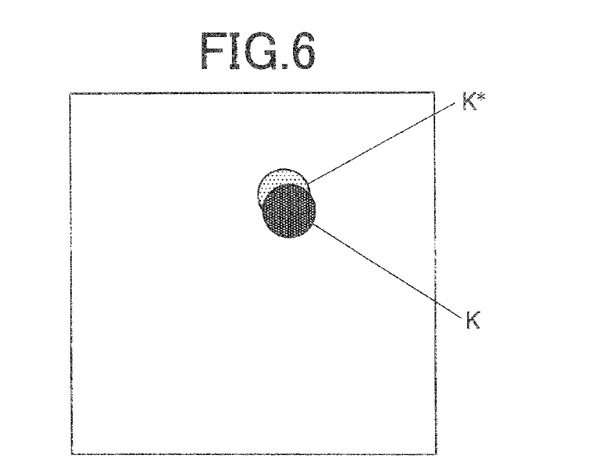
FIG. 6 shows an example of a captured image including a subject image before and after change of the image-capturing direction.

Depending on the timing that the image-capturing direction is changed, the subject image may be blurred in the captured image. FIG. 6 shows an example of a captured image in which the subject image is blurred.

Among the lines in one frame, when the image-capturing direction is changed during the exposure term of the line in which the subject is positioned, as shown in FIG. 6, not only the subject K after changing the image-capturing direction but also the subject K* before changing is imaged in the captured image like an afterimage. Since a plurality of subjects K and K* are detected as the subject which is to be the basis for determining the image-capturing direction of the next frame, the control of the image-capturing direction becomes difficult.

The control unit 15 determines the valid term of the change of the image-capturing direction according to the exposure term of each frame so that the image-capturing direction can be changed at the timing that the blur of the subject image does not occur. Since the exposure term of each frame is different depending on the driving method of the image-capturing unit 11, the control unit 15 determines the valid term according to the following for each driving method.

Figure 7:
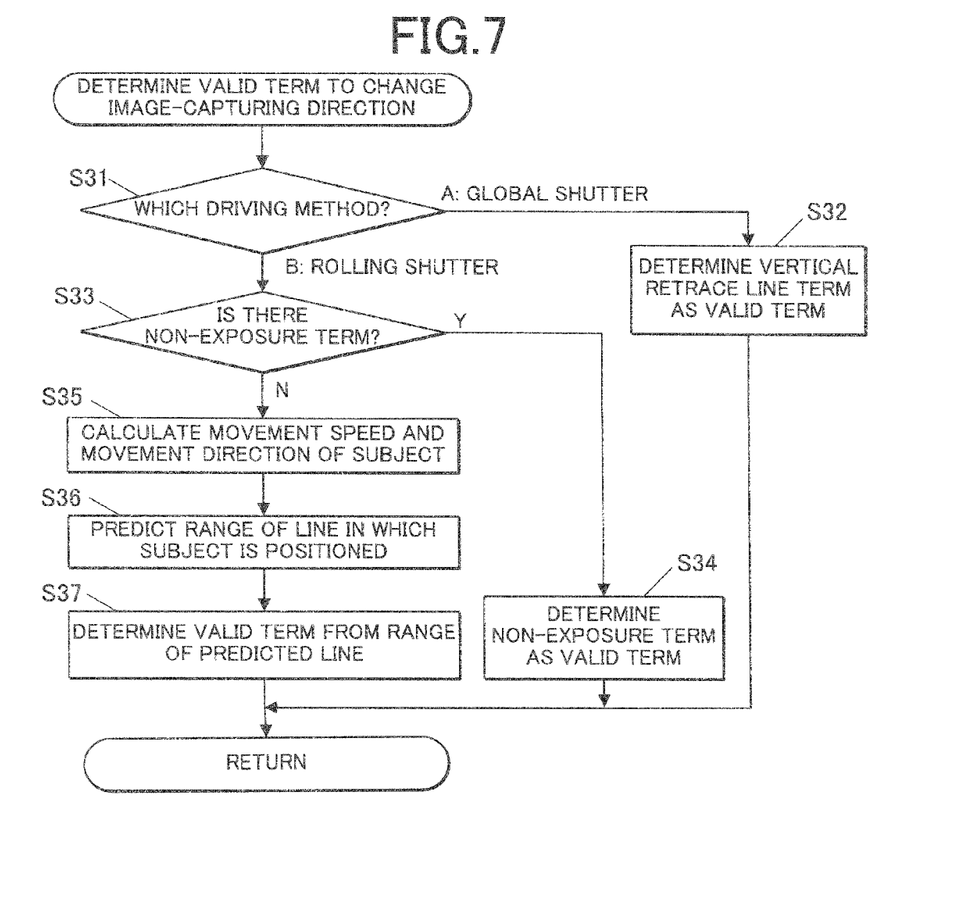
FIG. 7 is a flowchart showing a process of determining a valid term of change of the image-capturing direction.

FIG. 7 shows a process to determine the valid term of the change in the image-capturing direction.

As shown in FIG. 7, when the driving method of the image-capturing unit 11 is the global shutter method (step S31; A), the control unit 15 determines a vertical retrace line term between the exposure term of the n-th frame and the exposure term of the next n+1-th frame as the valid term (step S32).

Figure 8:
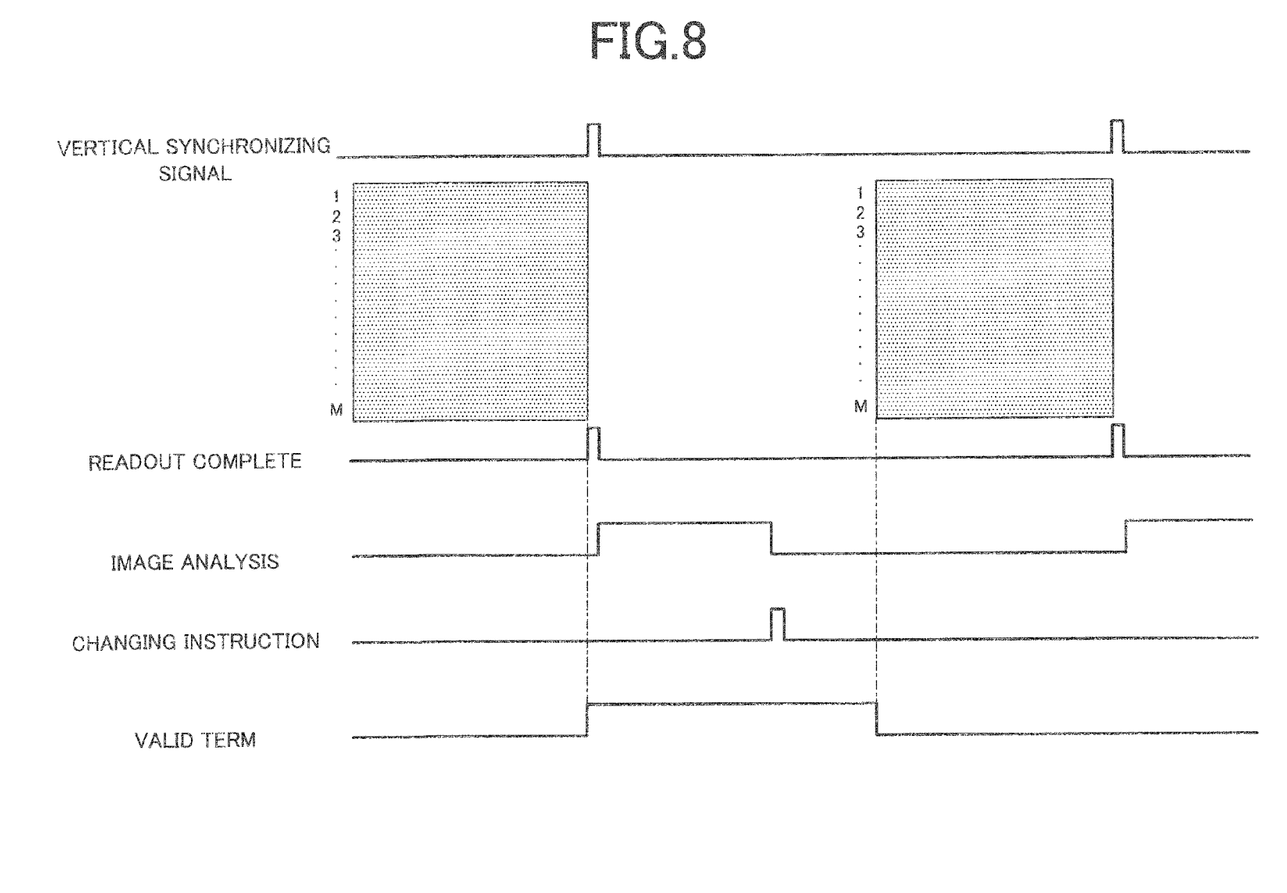
FIG. 8 is a timing chart showing an exposure term of each frame when a driving method is a global shutter method.

FIG. 8 shows an exposure term of each frame in the global shutter method. In FIG. 8, the shaded portion shows lines 1 to M in the n-th frame and the n+1-th frame.

As shown in FIG. 8, in a global shutter method, exposure of lines 1 to M is performed in parallel and readout is also completed in parallel. The vertical retrace line term from the last line M of the n-th frame to the first line 1 of the n+1-th frame is the non-exposure term. During this term, the subject image is not blurred even if the image-capturing direction is changed. Therefore, the control unit 15 can determine the vertical retrace line term as the valid term.

As shown in FIG. 8, after readout of all of the lines 1 to M of one frame is complete, the image analysis such as determining the image-capturing direction and the valid term is started. When the valid term is the vertical retrace line term, the valid term continues from after the readout is complete. Therefore, as shown in FIG. 8, it is possible to instruct change of the image-capturing direction at the point when the image analysis is complete.

When the driving method of the image-capturing unit 11 is the rolling shutter method (step S31; B), the control unit 15 judges during the exposure term of each frame whether the non-exposure term is a length sufficient enough to change the image-capturing direction (step S33). When it is judged that the non-exposure term is long enough (step S33; Y), the control unit 15 determines the non-exposure term as the valid term to change the image-capturing direction (step S34).

Figure 9:
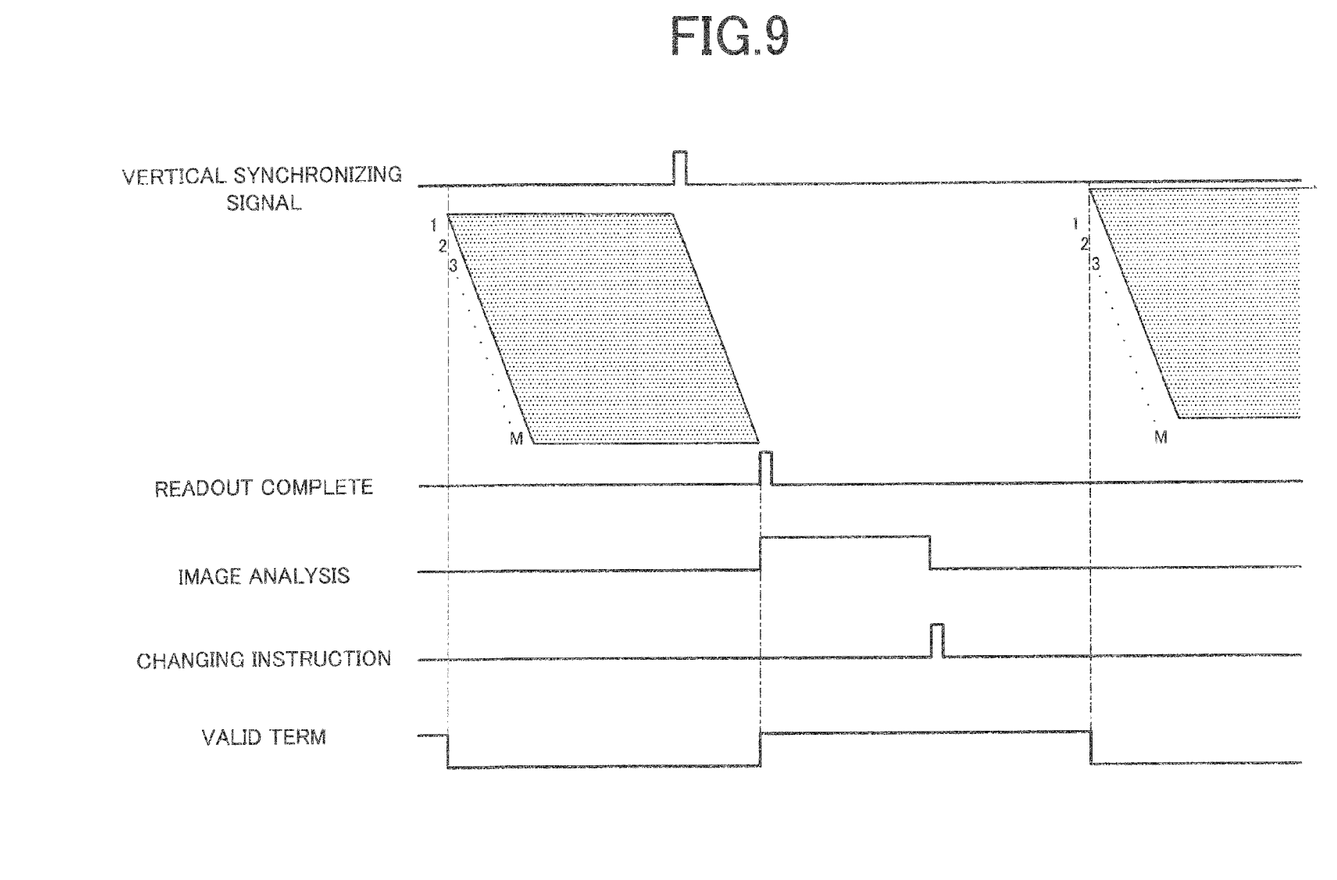
FIG. 9 is a timing chart showing an exposure term of each frame when the driving method is a rolling shutter method and there is a non-exposure term between each frame.

FIG. 9 shows the exposure term of each frame when the non-exposure term is a sufficient length in the rolling shutter method. In FIG. 9, the shaded portion shows the lines 1 to M in the n-th frame and the n+1-th frame.

In the rolling shutter method, as shown in FIG. 9, the timing of starting exposure in each line 1 to M is delayed for each line, and there is a difference in time from the readout of the first line 1 completing to the readout of the last line M completing. Therefore, even if the frame rate is the same, the term between the exposure terms of each frame is shorter in the rolling shutter method than the global shutter method.

Even in such case, when the frame rate itself is low, the non-exposure term from the readout of the last line M of the n-th frame completing to the start of exposure of the first line 1 of the n+1-th frame may be sufficiently longer than the time necessary to change the image-capturing direction. As described above, since the subject image is not blurred when the image-capturing direction is changed during the non-exposure term, the control unit 15 determines the sufficiently long non-exposure term as the valid term to change the image-capturing direction.

Similar to the global shutter method, the determined valid term starts after the exposure of the last line M is completed. Therefore, as shown in FIG. 9, it is possible to instruct change of the image-capturing direction at the point when the image analysis is complete.

When the non-exposure term is not sufficiently long (step S33; N), the control unit 15 calculates the movement speed and the movement direction of the subject based on the change of the position of the detected subject in the captured image of the n-th frame and the n−1-th frame (step S35).

For example, the control unit 15 obtains as the movement amount the number of pixels in the x direction and the number of pixels in the y direction from the position of the center of gravity of the subject in the n−1-th frame to the position of the center of gravity of the subject in the n-th frame. The movement amount in the x direction and the y direction are divided by the difference in time of image-capturing each frame, and with this, the movement speed in the x direction and the y direction can be obtained. Moreover, the control unit 15 is able to calculate as the movement direction the vector direction from the position of the center of gravity of the subject in the n−1-th frame to the position of the center of gravity of the subject in the n-th frame.

Based on at least one of the calculated movement speed or the movement direction, the control unit 15 predicts the range of the line in which the subject is positioned in the next n+1-th frame (step S36).

For example, when the movement speed of the subject in the y direction is −2 pixels/msec, the subject with a position of the center of gravity in the n-th frame being (x1, y1) is predicted to move to the position with a position coordinate y1−120 in the y direction in the n+1-th frame captured 60 msec later. The line in which the position coordinate being y1−120 in the y direction is to be the reference, and the range of the line from y1−320 to y 1+80 including ±200 lines considering the error of measurement of the width of the subject can be predicted to be the range of the line in which the subject is positioned in the next frame.

The control unit 15 determines the following term as the valid term to change the image-capturing direction, from when the exposure of the range of the line in which the subject is detected in the n-th frame is complete, to when the exposure of the range of the line in which the subject is predicted to be positioned in the n+1-th frame is started (step S37).

Figure 10:
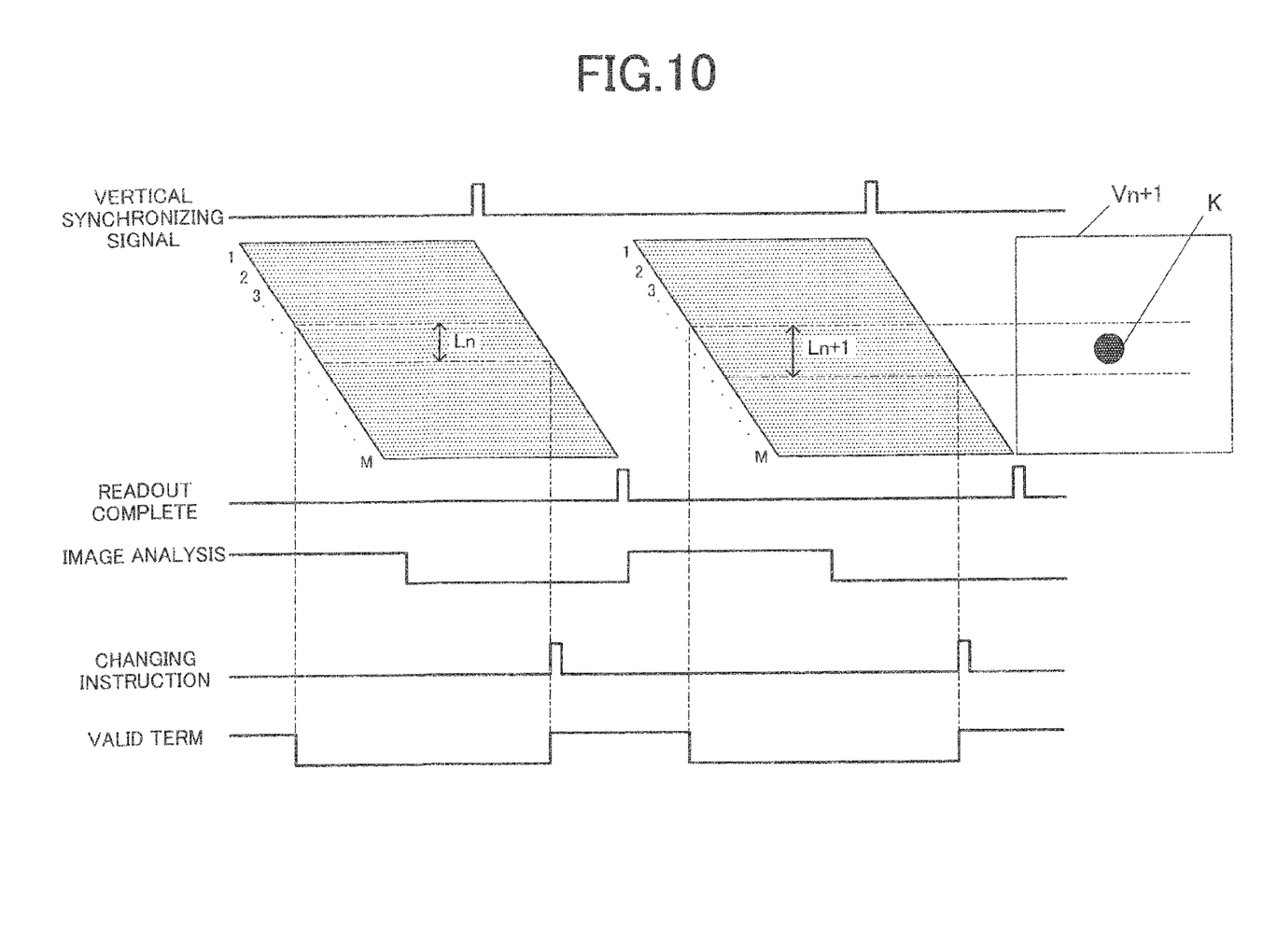
FIG. 10 is a timing chart showing an exposure term of each frame when the driving method is the rolling shutter method and there is no non-exposure term between each frame.

FIG. 10 shows an exposure term of each frame when the non-exposure term is not sufficiently long in the rolling shutter method. In FIG. 10, the shaded portion shows the lines 1 to M in the n-th frame and the n+1-th frame.

As shown in FIG. 10, after the readout of the last line M in the n-th frame is complete, and the exposure of the first line 1 in the n+1-th frame is started immediately, there is no non-exposure term and therefore the non-exposure term cannot be determined as the valid term.

In this case, by detecting the subject in step S22, the following can be determined as the valid term, from when the exposure ends in the last line of the range of the line Ln in which the subject is detected in the n-th frame, to when the exposure starts in the first line of the range of the line Ln+1 in which the subject K is predicted to be positioned in the captured image Vn+1 in the n+1-th frame. The image-capturing direction is changed during the exposure term of the line other than the range of the line Ln and the range of the line Ln+1. Since the subject is not positioned in the captured image in the lines other than the line Ln and the line Ln+1, the image of the subject is not blurred.

When the valid term is determined as described above, as shown in FIG. 10, the valid term starts after the exposure of the range of the line Ln of the n-th frame is completed. However, since the new image-capturing direction is determined by image analysis, it is necessary to wait for the image analysis, which starts after readout of the last line M is completed, to be completed before the image-capturing direction is changed. When the image analysis is completed before the start of exposure of the first line in the range of the line Ln+1 of the n+1-th frame, since the term is within the valid term, the change of the image-capturing direction can be instructed when the image analysis is complete. As shown in FIG. 10, when the image analysis is not complete by the start of exposure of the first line in the range of the line Ln+1, the change of the image-capturing direction can be instructed at the point when the image analysis is complete within the valid term after the exposure of the last line in the range of line Ln+1 is complete. In this case, the timing that the image-capturing direction is changed is delayed 1 frame. However, if the delay is within the range that the subject can be detected in the captured image, the subject can be chased.

When the determination of the valid term is finished, as shown in FIG. 2, the control unit 15 judges whether the present point is within the valid term (step S4).

When it is judged that it is not within the valid term (step S4; N), the control unit 15 repeats the judgment of step 54 and waits until the valid term. When it is judged that it is within the valid term (step S4; Y), the control unit 15 outputs the instruction information regarding the change of the image-capturing direction generated in step S24 to the platform driving unit 13. The platform driving unit 13 performs change of the image-capturing direction according to the instruction information of the image-capturing direction output from the control unit 15 (step S5).

As described above, the image-capturing apparatus 1 of the present embodiment includes the following, an image-capturing unit 11 which exposes each frame to generate the captured image of the subject, a platform 12 and platform driving unit 13 which changes the image-capturing direction of the image-capturing unit 11, a control unit 15 which detects the position of the subject in the captured image of the frame generated by the image-capturing unit 11, determines the image-capturing direction in the next frame according to the position of the detected subject, and changes the image-capturing direction of the image-capturing unit 11 to the determined image-capturing direction with the platform driving unit 13. The control unit 15 determines the valid term to change the image-capturing direction according to the exposure term of the image-capturing unit 11 and changes the image-capturing direction with the platform driving unit 13 within the determined valid term.

With this, the timing to change the image-capturing direction can be set within the non-exposure term or within the exposure term of the line in which the subject is not positioned. With this, it is possible to prevent blurring of the subject image due to the change of the image-capturing direction, and the image-capturing direction can be changed according to the position of the subject.

According to the above-described embodiment, when the driving method of the image-capturing unit 11 is the global shutter method, the control unit 15 determines the vertical retrace line term from the above frame to the next frame as the valid term.

With this, it is possible to control the timing to change the image-capturing direction in the non-exposure term, and the blurring of the image of the subject can be prevented.

According to the above-described embodiment, when the driving method of the image-capturing unit 11 is the rolling shutter method, the control unit 15 determines the non-exposure term from finishing exposure of the last line of the above frame to the start of exposure of the first line of the next frame as the valid term.

With this, it is possible to control the timing to change the image-capturing direction in the non-exposure term, and the blurring of the subject image can be prevented.

According to the above-described embodiment, the control unit 15 calculates the movement speed and the movement direction of the subject detected in the above frame, and based on at least one of the calculated movement speed and the movement direction of the subject, the range of the line in which the subject is positioned in the next frame is predicted. When the driving method of the image-capturing unit 11 is the rolling shutter method, the control unit 15 determines the term from the end of exposure of the range of the line in which the subject is detected in the above frame to the start of exposure of the range of the line in which the subject is predicted to be positioned in the next frame as the valid term.

With this, it is possible to control the timing to change the image-capturing direction in the exposure term of the line in which the subject is not positioned, and the blurring of the image of the subject can be prevented.

According to the above-described embodiment, the platform driving unit 13 drives the platform 12 of the image-capturing unit 11 to rotate or move the image-capturing unit 11 and changes the image-capturing direction of the image-capturing unit 11.

The image-capturing direction of the image-capturing unit 11 can be changed with the platform 12.

The above-described embodiment is one suitable example of the present invention, and the present invention is not limited to the above. The present invention can be suitably modified without leaving the scope of the present invention.

For example, according to the above-described embodiment, the platform 12 is driven to change the image-capturing direction, and the angle of the optical axis entering the imaging element 112 of the image-capturing unit 11 can be changed to change the image-capturing direction.

Specifically, the driving unit 113 drives the mirror used in the optical system 111 and changes the angle of the reflecting face of the mirror to change the angle of the optical axis entering the imaging element 112 as the subject image. When the optical system 111 includes a lens for correcting hand shaking, the angle of the optical axis entering the imaging element 112 as the subject image can be changed by the position or the posture of the lens being changed with the driving unit 113.

According to the above-described embodiment, the image-capturing apparatus 1 detects the subject in the captured image, determines the next image-capturing direction according to the position of the subject, and automatically changes the image-capturing direction to the determined image-capturing direction. However, the present invention is not limited to the above. For example, when the platform 12 can be controlled by remote control and the user changes the image-capturing direction while scanning the platform 12 with the remote control while watching the subject, the control to enable change of the image-capturing direction within the valid term is effective.

Although various exemplary embodiments have been shown and described, the invention is not limited to the embodiments shown. Therefore, the scope of the invention is intended to be limited solely by the scope of the claims that follow and its equivalents.

What is claimed is:

1. An image-capturing apparatus comprising:
   an image-capturing device, wherein an image-capturing direction of the image-capturing device is changeable; and a processor which executes a program stored in a memory to perform operations comprising:
controlling the image-capturing device to perform exposure of a frame to generate a captured image of a subject;
determining a valid term for changing the image-capturing direction according to an exposure term of the image-capturing unit;
detecting a position of the subject in the frame of the generated captured image;
determining the image-capturing direction in a next frame according to the detected position of the subject; and
controlling the image-capturing direction to change to the determined direction during the determined valid term.

2. The image-capturing apparatus according to claim 1, wherein the processor determines a vertical retrace line term from one frame to a next frame as the valid term when a driving method of the image-capturing device is a global shutter method.

3. The image-capturing apparatus according to claim 1, wherein the processor determines a non-exposure term from an end of exposure of a last line in one frame to a start of exposure of a first line in a next frame as the valid term when a driving method of the image-capturing device is a rolling shutter method.

4. The image-capturing apparatus according to claim 1, the operations further comprising:
calculating a movement speed and a movement direction of the subject detected in the frame; and
predicting a range of a line of a position of the subject in the next frame based on at least one of the movement speed and the movement direction of the subject;
wherein, when a driving method of the image-capturing device is a rolling shutter method, the processor determines a term from an end of exposure of a range of a line in which the subject is detected in the frame to a start of exposure of a range of a line predicted to be where the subject is positioned in the next frame as the valid term.

5. The image-capturing apparatus according to claim 1, further comprising a platform which supports the image-capturing device,
wherein the processor controls the image-capturing direction of the image-capturing device to change by driving the platform to rotate or move the image-capturing device.

6. The image-capturing apparatus according to claim 1, wherein the image-capturing device comprises:
an optical system which images entering light; and
an imaging element which performs photoelectric conversion on entering light imaged by the optical system; and
wherein the processor controls the image-capturing direction of the image-capturing device to change by driving the optical system to change an angle of an optical axis entering the imaging element.

7. A method to control an image-capturing apparatus including an image-capturing device, wherein an image-capturing direction of the image-capturing device is changeable, the method comprising:
controlling the image-capturing device to perform exposure of a frame to generate a captured image of a subject;
determining a valid term for changing the image-capturing direction according to an exposure term of the image-capturing device;
detecting a position of the subject in the frame of the generated captured image;
determining the image-capturing direction in a next frame according to the detected position of the subject; and
controlling the image-capturing direction of the image-capturing device to change to the determined direction during the determined valid term.

8. A non-transitory computer readable medium including a program that is executable by a computer of an image-capturing apparatus including an image-capturing device, wherein an image-capturing direction of the image-capturing device is changeable, the program being executable to control the computer to perform functions comprising:
controlling the image-capturing device to perform exposure of a frame to generate a captured image of a subject;
determining a valid term for changing the image-capturing direction according to an exposure term of the image-capturing device;
detecting a position of the subject in the frame of the generated captured image;
determining the image-capturing direction in a next frame according to the detected position of the subject; and
controlling the image-capturing direction of the image-capturing device to change to the determined direction during the determined valid term.

* * * * *